United States Patent
Tomaru

(10) Patent No.: US 7,865,086 B2
(45) Date of Patent: Jan. 4, 2011

(54) OPTICAL TRANSPONDER FOR SECURE OPTICAL COMMUNICATIONS AND OPTICAL QUADRATURE-MEASURING INSTRUMENT

(75) Inventor: Tatsuya Tomaru, Hatoyama (JP)

(73) Assignee: Hitachi, Ltd., Tokyo (JP)

( * ) Notice: Subject to any disclaimer, the term of this patent is extended or adjusted under 35 U.S.C. 154(b) by 656 days.

(21) Appl. No.: 11/905,814

(22) Filed: Oct. 4, 2007

(65) Prior Publication Data

US 2008/0085121 A1   Apr. 10, 2008

(30) Foreign Application Priority Data

Oct. 5, 2006   (JP) .............................. 2006-273571

(51) Int. Cl.
  H04L 9/12    (2006.01)
  H04B 10/00   (2006.01)
  H04B 10/04   (2006.01)
  H04B 10/06   (2006.01)

(52) U.S. Cl. ...................... 398/204; 398/202; 398/182; 398/200; 398/201

(58) Field of Classification Search ................ 398/204, 398/202, 182, 200, 201
  See application file for complete search history.

(56) References Cited

U.S. PATENT DOCUMENTS

| | | | |
|---|---|---|---|
| 7,529,490 B2 * | 5/2009 | Hoshida | 398/207 |
| 7,609,982 B2 * | 10/2009 | Ikeuchi | 398/214 |
| 7,756,385 B2 * | 7/2010 | Tomaru | 385/147 |
| 2005/0281561 A1 * | 12/2005 | Tomaru | 398/161 |
| 2006/0153573 A1 * | 7/2006 | Tomaru | 398/152 |
| 2006/0280509 A1 * | 12/2006 | Tomaru et al. | 398/188 |
| 2007/0127933 A1 * | 6/2007 | Hoshida et al. | 398/202 |
| 2008/0085121 A1 * | 4/2008 | Tomaru | 398/138 |

FOREIGN PATENT DOCUMENTS

| | | | |
|---|---|---|---|
| JP | 2006-191410 | | 1/2005 |
| JP | 2007-129386 | | 11/2005 |
| JP | 2006191410 A | * | 7/2006 |
| JP | 2007129386 A | * | 5/2007 |

OTHER PUBLICATIONS

"Secure Optical Communication using antisqueezing" Tatsuya Tomaru and Masahi Ban, Physical Review A 74 032312 (2006).*

* cited by examiner

Primary Examiner—Ken N Vanderpuye
Assistant Examiner—Oommen Jacob
(74) Attorney, Agent, or Firm—Stites & Harbison, PLLC; Juan Carlos A. Marquez, Esq

(57) ABSTRACT

Regardless of a transmission basis, a phase of a signal light with reference to a phase of local light is measured, and an output light from an antisqueezed light source in a transponder device is modulated in accordance with the measured phase. Since information obtainable in the transponder device is only the relative phase of the signal light with reference to the phase of the local light, and includes fluctuations corresponding to an antisqueezed component of the signal light, even if the information in the transponder device is eavesdropped on, the information cannot be decoded easily.

1 Claim, 9 Drawing Sheets

OPTICAL TRANSPONDER FOR SECURE OPTICAL COMMUNICATIONS AND OPTICAL QUADRATURE-MEASURING INSTRUMENT

CLAIM OF PRIORITY

The present application claims priority from Japanese application JP2006-273571 filed on Oct. 5, 2006, the content of which is hereby incorporated by reference into this application.

BACKGROUND OF THE INVENTION

The present invention relates to an optical transponder for secure optical communications and an optical quadrature-measuring instrument and in particular relates to quantum communications, quantum cryptography and optical communications.

Demand for secrecy in communications is a never ending theme from the ancient to the future, and in the network society in the recent years, development of cryptography has satisfied that demand. The security of public-key cryptosystem and the like which are currently popular is based on requirement for unrealistic time expenditure for decryption. However, computer technology is always progressing. Therefore, public-key cryptosystem and the like are not necessarily guaranteed on its security over the future. On the other hand, quantum cryptography that is actively being researched now is guaranteed by physical laws in security, and will not be deteriorated in security how far technology may be advanced, and realization thereof is being desired.

So far, various communication methods with techniques based on quantum mechanics have been proposed. However, the quantum state changes in an irreversible manner simply by influence of losses and external environments. Therefore, realization thereof is difficult in general. Under such circumstances, it has become apparent that utilization of anti-squeezed component in a squeezed state being one of representative quantum states enables an application of quantum information technologies on a practical level (JP-A-2007-129386). The reason thereof is that the antisqueezed component can maintain its nature against the losses or amplification. Light including the antisqueezed component, that is, light with its non-isotropic shape of fluctuations on quadrature phase space is defined as antisqueezed light. Even if the antisqueezed light is amplified, its nature can be retained. Therefore, even if losses take place in transmission paths or respective kinds of components, it is possible to compensate the losses, and installation of a transponder station is feasible. However, all relays have to be carried out in the state of light. Although an all-optical network gradually increases so as to enable the relays to be carried out only with the optical processing, the relays only with the optical processing are naturally placed under various limiting conditions and a relay method of temporary conversion from optical signal to electric signal is important as well.

JP-A-2007-129386 and so forth intend to use quantum cryptography to, in general, prevent eavesdropping in a transmission path and naturally to enable a legitimate receiver to receive correct information. An electric circuit-based transponder is nothing else to receive and retransmit optical signals. Therefore, adoption of electric circuit-based transponder will temporarily settle a signal in the transponder station to expose itself to the risk of eavesdropping.

BRIEF SUMMARY OF THE INVENTION

An object of the present invention is to provide an electric circuit-based transponder without settling signal.

In a communication method where a direction of a basis in a quadrature phase space is determined in accordance with a random number or a pseudo-random number when transmitting a binary signal, a receiving party cannot obtain correct information unless the receiving party knows the random number or pseudo-random number which was used to transmit the signal with the basis. In the present invention, a transponder station measures a relative phase of a signal light with respect to a local light to modulate, in accordance with the measured relative phase, an output light generated by an antisqueezed light source installed in the transponder station. The value measured in the transponder station includes only the relative phase of the signal light with respect to the local light and does not include the signal itself. Therefore, secrecy of communications is maintained. Since the signal light is an antisqueezed light having its large fluctuations in the phase direction, the measured relative phase fluctuates in accordance with a degree of antisqueezing when the signal light is received by the transponder station. However, the final valid receiver knows the basis of the transmitted signal or otherwise receives only the transmitted signal whose transmission basis is identical to a receiving basis. Accordingly, in spite of the large fluctuations due to the antisqueezing, an error rate is restrained sufficiently from increasing.

The substances of the invention are as follows.

1. An optical transponder for obtaining an output light from an input signal light antisqueezed in a phase direction, comprises,
    a local light source for generating a local light,
    a relative phase detector for receiving the input signal light and the local light and for measuring a relative phase $\theta$ between the input signal light and the local light,
    an antisqueezed light source for generating an output light with antisqueezed fluctuations in a direction perpendicular to its amplitude in phase space, and
    a phase modulator for modulating the output antisqueezed light in accordance with the relative phase difference $\theta$ measured by the relative phase difference detector to generate the output light.

2. In the optical transponder according to the above 1, $\phi_1 = \phi_s + \Delta\phi_s + \alpha$, when a phase of the input signal light is $\phi_1$, $\phi_s$ is a binary signal changeable between 0 and $\pi$, a fluctuation of the input signal light antisqueezed in the phase direction is $\Delta\phi_s$, and $\alpha$ is a phase defined by one of random number or pseudo-random number.

3. The optical transponder according to the above 1, further comprises,
    a first beam splitter for dividing the input signal light into first and second input signal lights in a polarization condition equal to a polarization condition of the local light,
    a second beam splitter for dividing the local light into first and second local lights,
    a third beam splitter for receiving the first input signal light and the first local light, dividing each of them into two parts of corresponding one of them, making one of the two parts of the first input signal light and one of the two parts of the first local light overlap each other, and making the other one of the two parts of the first input signal light and the other one of the two parts of the first local light overlap each other, so that the one of the two parts of the first input signal light and the one of the two parts of the first local light interfere with each other to generate a first interference light beam, and the other one of the two parts of the first input signal light and the other one of the two parts of the first local light interfere with each other to generate another first interference light beam, first and second photodetectors for converting the first interference light beam and the another first interference light beam to respective electric signals, a first differential output device for generating a first differential signal from the electric signals generated respectively by the first and second photodetectors, a fourth beam splitter for receiving the second input signal light and the second local light, dividing each of them into two parts of corresponding one of them, making one of the two parts of the second input signal light and one of the two parts of the second local light overlap each other, and making the other one of the two parts of the second input signal light and the other one of the two parts of the second local light overlap each other, so that the one of the two parts of the second input signal light and the one of the two parts of the second local light interfere with each other to generate a second interference light beam, and the other one of the two parts of the second input signal light and the other one of the two parts of the second local light interfere with each other to generate another second interference light beam, third and fourth photodetectors for converting the second interference light beam and the another second interference light beam to respective electric signals, and a second differential output device for generating a second differential signal from the electric signals generated respectively by the third and fourth photodetectors, wherein the first and second differential signals are quadratures different in phase by 90 degrees from each other obtained by at least one of arranging a phase adjuster on at least one of an optical path between the first and third beam splitters, an optical path between the first and fourth beam splitters, an optical path between the second and third beam splitters and an optical path between the second and fourth beam splitters, and arranging at least one of the first, second, third and fourth beam splitters in a direction different from being parallel to a main surface direction of the respective beam splitter to adjust a difference in phase between the first and second differential signals, so that the relative phase θ is obtained from the first and second differential signals.

4. The optical transponder according to the above 1, further comprises, a first polarizing beam splitter for receiving the input signal light and the local light as linearly polarized lights perpendicular to each other to output simultaneously the input signal light and the local light as the linearly polarized lights in an optical path, a first beam splitter for dividing the input signal light into two parts of the input signal light and dividing the local light into two parts of the local light, a second polarizing beam splitter for receiving one of the two parts of the input signal light and one of the two parts of the local light, dividing the one of the two parts of the input signal light into two portions of the one of the two parts of the input signal light, dividing the one of the two parts of the local light into two portions of the one of the two parts of the local light, making one of the two portions of the one of the two parts of the input signal light and one of the two portions of the one of the two parts of the local light interfere with each other to generate a first interference light beam, and making the other one of the two portions of the one of the two parts of the input signal light and the other one of the two portions of the one of the two parts of the local light interfere with each other to generate a second interference light beam, first and second photodetectors for converting the first and second interference light beams to respective electric signals, a first differential output device for generating a first differential signal from the electric signals generated respectively by the first and second photodetectors, a λ/4 waveplate for transmitting simultaneously therethrough the other one of the two parts of the input signal light and the other one of the two parts of the local light, the polarized directions of the other one of the two parts of the input signal light and the other one of the two parts of the local light being identical to the optical axes of the λ/4 waveplate, respectively, a third polarizing beam splitter for receiving the other one of the two parts of the input signal light from the λ/4 waveplate and the other one of the two parts of the local light from the λ/4 waveplate, dividing the other one of the two parts of the input signal light into two portions of the other one of the two parts of the input signal light, dividing the other one of the two parts of the local light into two portions of the other one of the two parts of the local light, making one of the two portions of the other one of the two parts of the input signal light and one of the two portions of the other one of the two parts of the local light interfere with each other to generate a third interference light beam, and making the other one of the two portions of the other one of the two parts of the input signal light and the other one of the two portions of the other one of the two parts of the local light interfere with each other to generate a fourth interference light beam, third and fourth photodetectors for converting the third and fourth interference light beams to respective electric signals, and a second differential output device for generating a second differential signal from the electric signals generated respectively by the third and fourth photodetectors, so that the relative phase θ is obtained from the first and second differential signals.

5. The optical transponder according to the above 1, further comprises, a first polarizing beam splitter for receiving the input signal light and the local light as linearly polarized lights perpendicular to each other to output simultaneously the input signal light and the local light as the linearly polarized lights in an optical path, a first beam splitter for dividing the input signal light into two parts of the input signal light and dividing the local light into two parts of the local light, a half waveplate for rotating polarized directions of one of the two parts of the input signal light and one of the two parts of the local light by 45 degrees, a second polarizing beam splitter for receiving the one of the two parts of the input signal light and the one of the two parts of the local light, dividing the one of the two parts of the input signal light into two portions of the one of the two parts of the input signal light, dividing the one of the two parts of the local light into two portions of the one of the two parts of the local light, making one of the two portions of the one of the two parts of the input signal light and one of the two portions of the one of the two parts of the local light interfere with each other to generate a first interference light beam, and making the other one of the two portions of the one of the two parts of the input signal light and the other one of the two portions of the one of the two parts of the local light interfere with each other to generate a second interference light beam, first and second photodetectors for converting the first and second interference light beams to respective electric signals, a first differential output device for generating a first differential signal from the electric signals generated respectively by the first and second photodetectors, a λ/4 waveplate for transmitting simultaneously therethrough the other one of the two parts of the input signal light and the other one of the two parts of the local light, the polarized directions of the other one of the two parts of the input signal light and the other one of the two parts of the local light being identical to the optical axes of the λ/4 waveplate, respectively, another half waveplate for rotating polarized directions of the other one of the two parts of the input signal light and the other one of the two parts of the local light by 45 degrees, a third polarizing beam splitter for receiving the other one of the two parts of the input signal light from the another half waveplate and the other one of the two parts of the local light from the another half waveplate, dividing the other one of the two parts of the input signal light into two portions of the other one of the two parts of the input signal light, dividing the other one of the two parts of the local light into two portions of the other one of the two parts of the local light, making one of the two portions of the other one of the two parts of the input signal light and one of the two portions of the other one of the two parts of the local light interfere with each other to generate a third interference light beam, and making the other one of the two portions of the other one of the two parts of the input signal light and the other one of the two portions of the other one of the two parts of the local light interfere with each other to generate a fourth interference light beam, third and fourth photodetectors for converting the third and fourth interference light beams to respective electric signals, and a second differential output device for generating a second differential signal from the electric signals generated respectively by the third and fourth photodetectors, so that the relative phase θ is obtained from the first and second differential signals.

6. The optical transponder according to the above 1, wherein the antisqueezed light source including a laser beam light source for generating an output light, an intensity modulator for converting the output light to a pulsed light, an optical amplifier for amplifying the pulsed light, a first optical fiber of negative group-velocity dispersion with respect to an operating wavelength λ of the laser beam light source, and a second optical fiber of negative group-velocity dispersion whose magnitude is lower than the magnitude of the negative group-velocity dispersion of the first optical fiber, when ΔT is the full width at half maximum of the pulse at the intensity modulator, a peak intensity of the pulsed light amplified by the optical amplifier is $P_0$, $T_0=\Delta T/(2\times 0.88137)$, $\beta_2$ is a group-velocity dispersion at the operating wavelength λ in the first optical fiber, γ is a nonlinear coefficient at λ in the first optical fiber, and N is a soliton order, ΔT, $P_0$ and $\beta_2$ are determined to make the soliton order N become not less than 2 according to the formula of $N^2=\gamma P_0 T_0^2/|\beta_2|$, the first optical fiber has a length of 60-150% of a fiber length $z_{opt}$ calculated according to the formula of $z_{opt}=z_0(0.32/N+1.1/N^2)$ when $z_0$ is a soliton period calculated according to the formula of $z_0=(\pi/2) T_0^2/|\beta_2|$ and the soliton order N is determined according to the above formula $N^2=\gamma P_0 T_0^2/|\beta_2|$ using the predetermined parameters γ, $P_0$, $T_0$, and $\beta_2$, the second optical fiber has a length of 1-100 km, and the final output light from the antisqueezed light source has noise whose magnitude in the phase direction is greater than that in the amplitude direction.

7. The optical transponder according to the above 1, further comprises, a first beam splitter for receiving the input signal light linearly polarized with an angular frequency ω and the local light circularly polarized with an angular frequency ω+δω so that both of them are combined with each other, a polarizing beam splitter for dividing the input signal light into two parts of the input signal light, and dividing the local light into two parts of the local light, a first photodetector for receiving one of the two parts of the input signal light and one of the two parts of the local light to generate a first output signal in accordance with the one of the two parts of the input signal light and the one of the two parts of the local light, a second photodetector for receiving the other one of the two parts of the input signal light and the other one of the two parts of the local light to generate a second output signal in accordance with the other one of the two parts of the input signal light and the other one of the two parts of the local light, the first and second output signals are treated hereafter in the identical phases, a first mixer for mixing the first output signal with a sine wave of an angular frequency δω to output a first mixed output signal, a second mixer for mixing the second output signal with another sine wave of an angular frequency δω to output a second mixed output signal, a first low pass filter for extracting a first component of angular frequency less than δω from the first mixed output signal, and a second low pass filter for extracting a second component of angular frequency less than δω from the second mixed output signal, so that the relative phase difference of the input signal light with respect to the local light is calculated from the first and second components.

8. The optical transponder according to the above 1, further comprises, a beam splitter for receiving the input signal light and the local light both having the identical polarizations with a difference in angular frequency of δω therebetween, so that the input signal light and the local light are combined with each other to generate output lights, a first photodetector for converting a part of the output lights from the beam splitter to a first electric signal, a second photodetector for converting the other part of the output lights from the beam splitter to a second electric signal, a differential output device for generating a differential signal from the first and second electric signals, a first mixer for mixing the differential signal with a first sine wave of an angular frequency δω to output a first mixed output signal, a second mixer for mixing the differential signal with a second sine wave of an angular frequency δω having a difference in phase of π/2 with respect to the first sine wave to output a second mixed output signal, a first low pass filter for extracting a first component of angular frequency less than δω from the first mixed output signal, and a second low pass filter for extracting a second component of angular frequency less than δω from the second mixed output signal, so that the relative phase of the input signal light with respect to the local light is calculated from the first and second components.

9. The optical transponder according to the above 1, further comprises, a beam splitter for receiving the input signal light and the local light both having the identical polarizations with a difference in angular frequency of δω therebetween, so that the input signal light and the local light are combined with each other to generate output lights, a photodetector for converting a part of the output lights from the beam splitter to an electric signal, a first mixer for mixing the electric signal with a first sine wave of an angular frequency δω to output a first mixed output signal, a second mixer for mixing the electric signal with a second sine wave of an angular frequency δω having a difference in phase of π/2 with respect to the first sine wave to output a second mixed output signal, a first low pass filter for extracting a first component of angular frequency less than δω from the first mixed output signal, and a second low pass filter for extracting a second component of angular frequency less than δω from the second mixed output signal, so that the relative phase of the input signal light with respect to the local light is calculated from the first and second components.

10. An apparatus for measuring two quadratures of light when an input signal light is supplied to the apparatus, comprises, a local light source for generating a local light, a first polarizing beam splitter for receiving the input signal light and the local light to be combined with each other with respective polarizations perpendicular to each other, a beam splitter for dividing the combined beam into a first beam splitter output light including a part of the input signal light and a part of the local light and a second beam splitter output light including the other part of the input signal light and the other part of the local light, a second polarizing beam splitter for dividing the first beam splitter output light into third and fourth beam splitter output lights, one of which includes a portion of the part of the input signal light and a portion of the part of the local light, and the other one of which includes the other portion of the part of the input signal light and the other portion of the part of the local light, first and second photodetectors for receiving the third and fourth beam splitter output lights respectively to generate a first output signal as a differential signal between the first and second photodetectors, a λ/4 waveplate for transmitting therethrough the second beam splitter output light including the other part of the input signal light and the other part of the local light with respective polarized directions identical to the optical axes of the waveplate, a third polarizing beam splitter for dividing the second beam splitter output light into fifth and sixth beam splitter output lights, one of which includes a portion of the other part of the input signal light and a portion of the other part of the local light, and the other one of which includes the other portion of the other part of the input signal light and the other portion of the other part of the local light, third and fourth photodetectors for receiving the fifth and sixth beam splitter output lights respectively to generate a second output signal as a differential signal between the third and fourth photodetectors.

11. An optical transponder for generating an output light from a signal light including signals superimposed on as the phase difference between successive bits whose interval is δL in optical length, comprises, a first beam splitter for dividing the signal light into first and second beam splitter output lights, a first asymmetrical interferometer of one of Mickelson type and Mach-Zehnder type, for receiving the first beam splitter output light with the difference δL in optical length to generate first and second interferometer output lights, first and second photodetectors for converting the first and second interferometer output lights to first and second electric signals, a first differential output device for receiving the first and second electric signals, a second asymmetrical interferometer of one of Mickelson type and Mach-Zehnder type, for receiving the second beam splitter output light with the difference δL in optical length to generate third and fourth interferometer output lights, third and fourth photodetectors for converting the third and fourth interferometer output lights to third and fourth electric signals, a second differential output device for receiving the third and fourth electric signals, an antisqueezed light source for generating a pulsed light, and a phase modulator for modulating the pulsed light, wherein a phase difference between the difference δL in optical length of the first asymmetrical interferometer and the difference δL in optical length of the second asymmetrical interferometer is set at 90 degrees to make the first and second differential output devices output respective components of output signals different from each other in phase by 90 degrees, so that a relative phase θ between signals adjacent to each other is obtained from the outputs of the first and second differential output devices, and the pulsed light of $i_{th}$ generated by the antisqueezed light source is modulated by a value determined according to the formula of $\Sigma_{(i \geq j)} \theta_j - 2\pi n$, when $\theta_i$ is the phase difference between signal of $(i-1)_{th}$ and signal of $i_{th}$, and n is an integral number satisfying the formula of $0 \leq \Sigma_{(i \geq j)} \theta_j - 2\pi n < 2\pi$.

According to the present invention, an improvement in security of relays of optical communications in comparison with the prior art is obtainable.

Other objects, features and advantages of the invention will become apparent from the following description of the embodiments of the invention taken in conjunction with the accompanying drawings.

DETAILED DESCRIPTION OF THE INVENTION

In an embodiment of the present invention, since a secure communications to which the quantum-mechanical principle is applied can be relayed electrically, secure optical communications improved by the physical principle can be formed on a current optical network platform. That enables the secure optical communications improved by the physical principle to be used for not only a special use such as state information and military information but also an ordinary home use.

Embodiment 1

Figure 1:
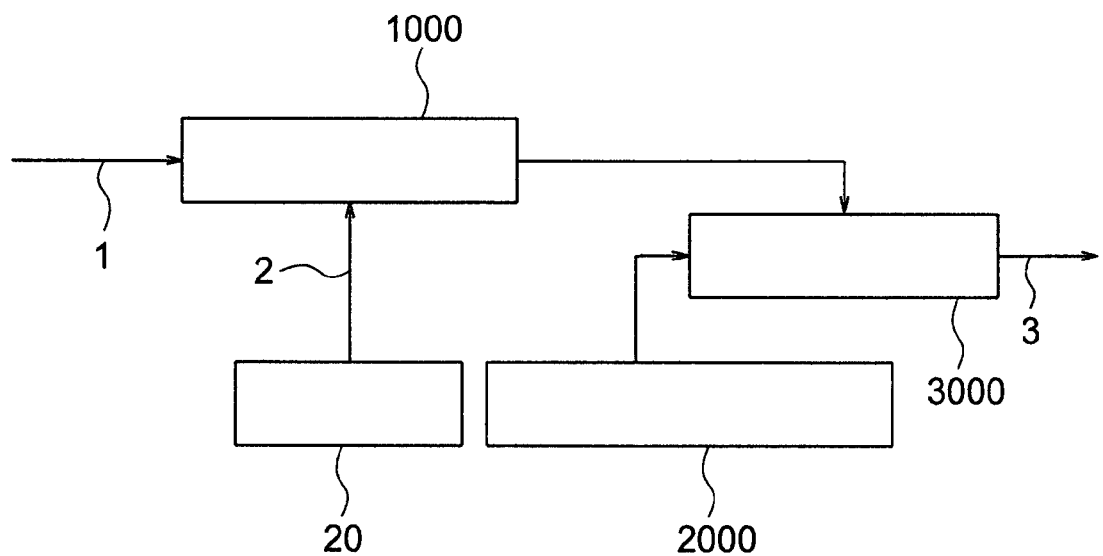
FIG. 1 is a block diagram showing a basic structure for realizing the present invention.

FIG. 1 is a block diagram illustrating an embodiment of the present invention. An input light 1 and a local light 2 output from a local light source 20 are input to a relative phase measuring apparatus 1000 so that a relative phase θ of the input light 1 with respect to the local light 2 is determined. In accordance with the relative phase θ, an output light from an antisqueezed light source 2000 is modulated by a modulator 3000 so that an output light 3 after a relay is obtained.

Figure 2:
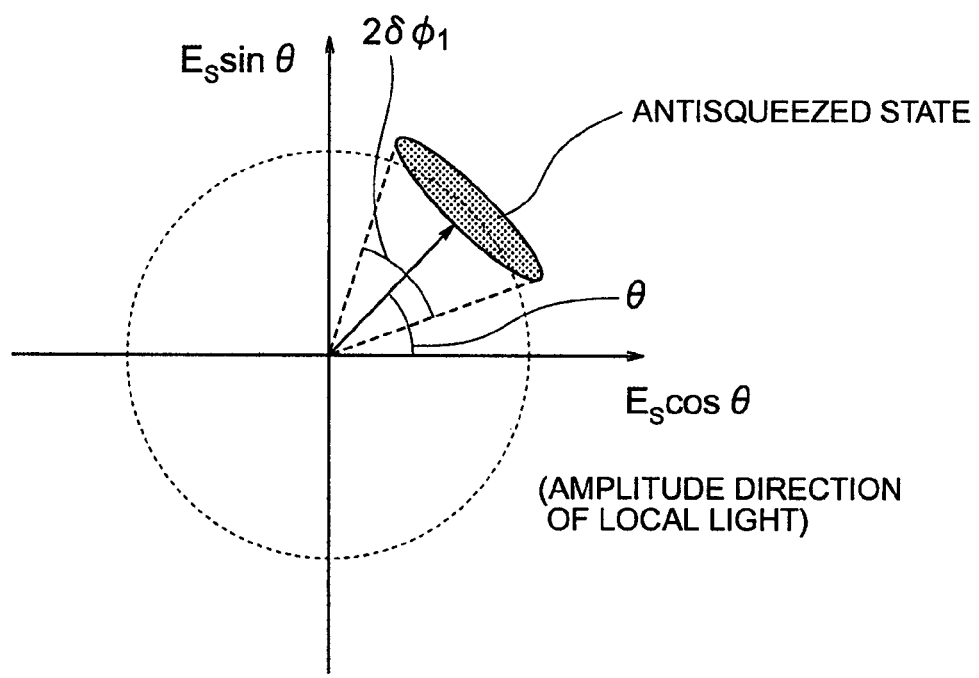
FIG. 2 is a schematic view showing an antisqueezed light.

In the present invention it is assumed that signals are superimposed on a format of a phase-shift keying (PSK), differential phase-shift keying (DPSK) or the like. When a binary signal $\phi_s$ corresponds to 0 and π and a phase α is determined in accordance with a random number or a pseudo-random number, the phase $\phi_1$ of the input signal light 1 is transmitted according to $\phi_1 = \phi_s + \alpha$. A system in which the secure communications are attained by the fact that the value α is unknown by eavesdroppers is categorized as a conventional cipher communication. In the present invention, an advantage of quantum mechanics is applied to such conventional cipher communication to improve the security. In accordance with the quantum mechanics, fluctuations necessarily exist, and the fluctuations are controllable. When the communication is carried out by a light (see FIG. 2) antisqueezed in a phase direction, the security is improved by the antisqueezed fluctuations. The phase difference θ obtained by the relative phase measuring apparatus 1000 includes the antisqueezed fluctuations. Since the phase θ obtained by a transponder device includes the phase α determined by the random number or a pseudo-random number, even if eavesdropping takes place, the signal $\phi_s$ is not decrypted easily (normal encrypted communication level), and the phase θ with the antisqueezed fluctuations makes a possibility of decrypting the signal $\phi_s$ further lower (quantum mechanical effect). Of course, in order to improve security, the transponder device is preferably structured to be physically robust to allow no eavesdropping. When the phase fluctuations of the input antisqueezed light have Gaussian distribution, a probability distribution of a phase θ output from the relative phase measuring apparatus 1000 is in proportion to $\exp[-(\theta-\theta_0)^2/\delta\phi_1^2]$ with the average value $\theta_0$ and the fluctuation width $\delta\phi_1$. When the light output from an antisqueezed light source 2000 in the transponder device also has Gaussian distribution on fluctuations in the phase direction, a probability distribution of the phase $\phi_2$ of the output light 3 is in proportion to a Gaussian distribution function $\exp[-(\phi_2-\theta)^2/\delta\phi_2^2]$ with the fluctuation width $\delta\phi_2$ and a center value θ which is the phase modulation amount at the phase modulator 3000. The phase $\phi_2$ of the output light 3 includes both of the fluctuations of the input light and the antisqueezed light source 2000 so that entire fluctuations as a total of both of the fluctuations are obtained by integrating the phase θ. That is, the probability distribution of the phase $\phi_2$ of the output light 3 is expressed by Expression 1.

$$\int \exp\left[-\left(\frac{\phi_2-\theta}{\delta\phi_2}\right)^2\right]\exp\left[-\left(\frac{\theta-\theta_0}{\delta\phi_1}\right)^2\right]d\theta \propto \exp\left[-\frac{(\phi_2-\theta_0)^2}{\delta\phi_1^2+\delta\phi_2^2}\right] \quad \text{[Formula 1]}$$

The fluctuation width of the phase $\phi_2$ of the output light 3 is $(\delta\phi_1^2+\delta\phi_2^2)^{1/2}$. In the secure optical communications using the antisqueezed light, since it is assumed that a legitimate receiver carries out measurement on the basis of knowledge of transmission basis (otherwise, data are accepted only when a receiving basis of the data is identical to a transmission basis), the enlarged fluctuations do not affect significantly. Therefore, even if fluctuations are enlarged, a relay is not affected significantly.

Embodiment 2

Figure 3:
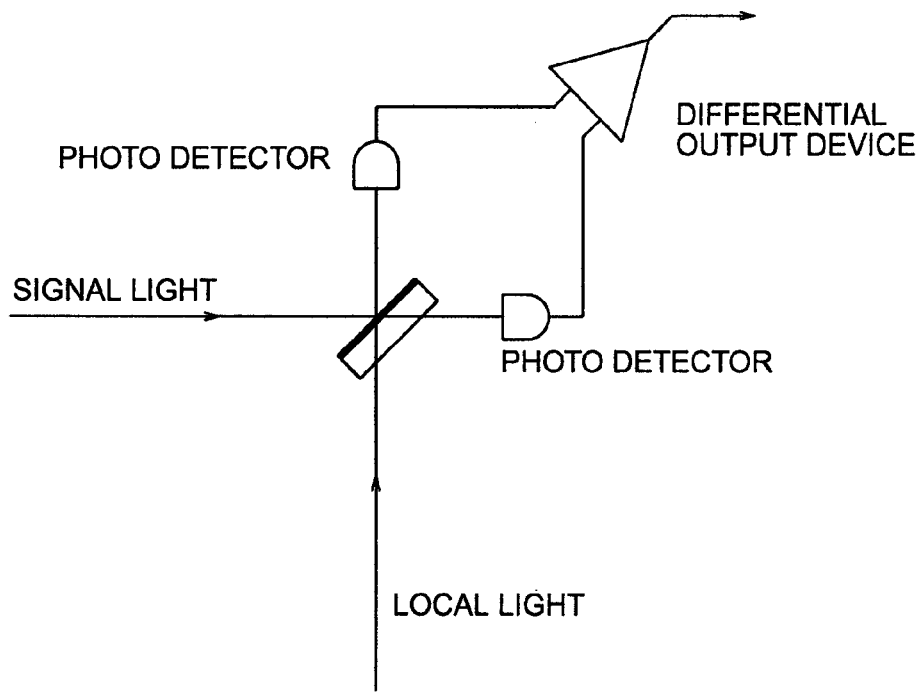
FIG. 3 is a schematic view showing a basic structure of a balanced homodyne detector.
Figure 4:
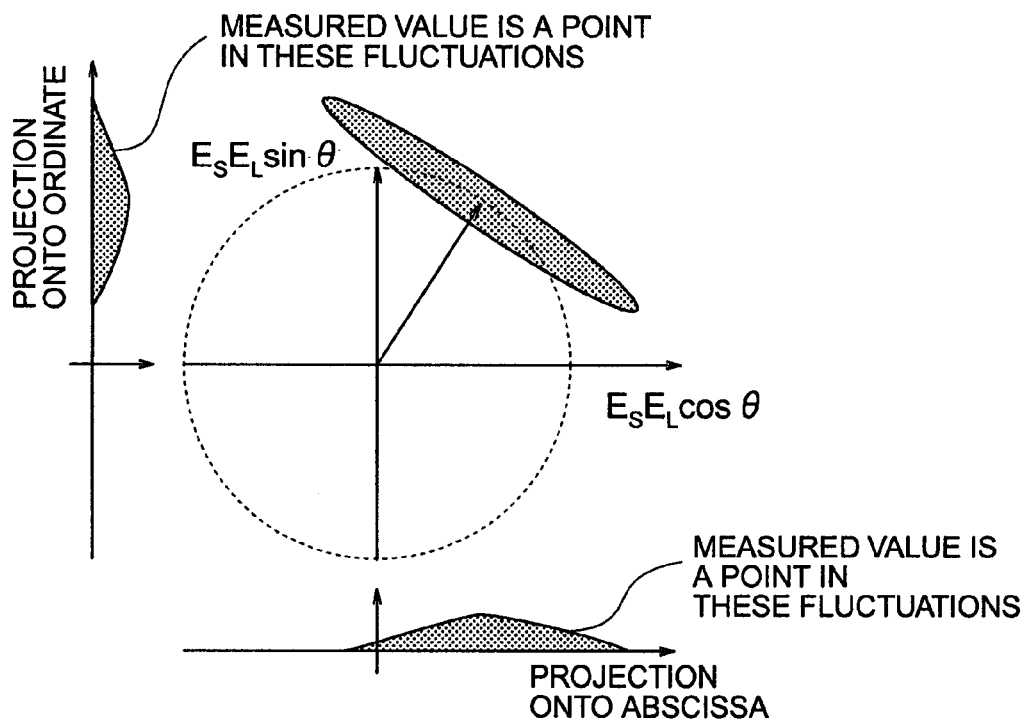
FIG. 4 is a schematic view showing probability distributions obtained by measuring the antisqueezed light with two sets of balanced homodyne detectors.

Next, a structure of the relative phase measuring apparatus 1000 will be described. So called homodyne detection and otherwise heterodyne detection is a basic structure. At first the case of homodyne detection will be described. FIG. 3 shows a balanced homodyne detector including a 50:50 beam splitter, two photodetectors and a differential output device. When an electric field of the input signal light is $E_s \cos(\omega t + \phi_1)$ and an electric field of the local light is $E_L \cos(\omega t + \phi_L)$, an output intensity of the differential output device is $2E_s E_L \cos(\omega t + \phi_1) \cos(\omega t + \phi_L)$. This is rewritten as $E_s E_L [\cos(\phi_1 - \phi_L) + \cos(2\omega t + \phi_1 + \phi_L)]$, and the photodetector does not follow a light angular frequency ω, so that the output of the balanced homodyne detector is $E_s E_L \cos(\phi_1 - \phi_L)$. In addition, when the phase of the local light is displaced to be $E_L \cos(\omega t + \phi_L + \pi/2)$, the output from the balanced homodyne detector is $E_s E_L \sin(\phi_1 - \phi_L)$. FIG. 4 illustrates that occasion under $\phi_1 - \phi_L = \theta$. Homodyne detection corresponds a projection of a quasi-probability distribution function on the quadrature phase space onto one of coordinates. The direction of the projection axis is determined by the phase of the local light. When two of the homodyne detectors are used, both of $E_s E_L \cos\theta$ and $E_s E_L \sin\theta$ can be obtained simultaneously so that the relative phase θ can be determined.

Figure 5:
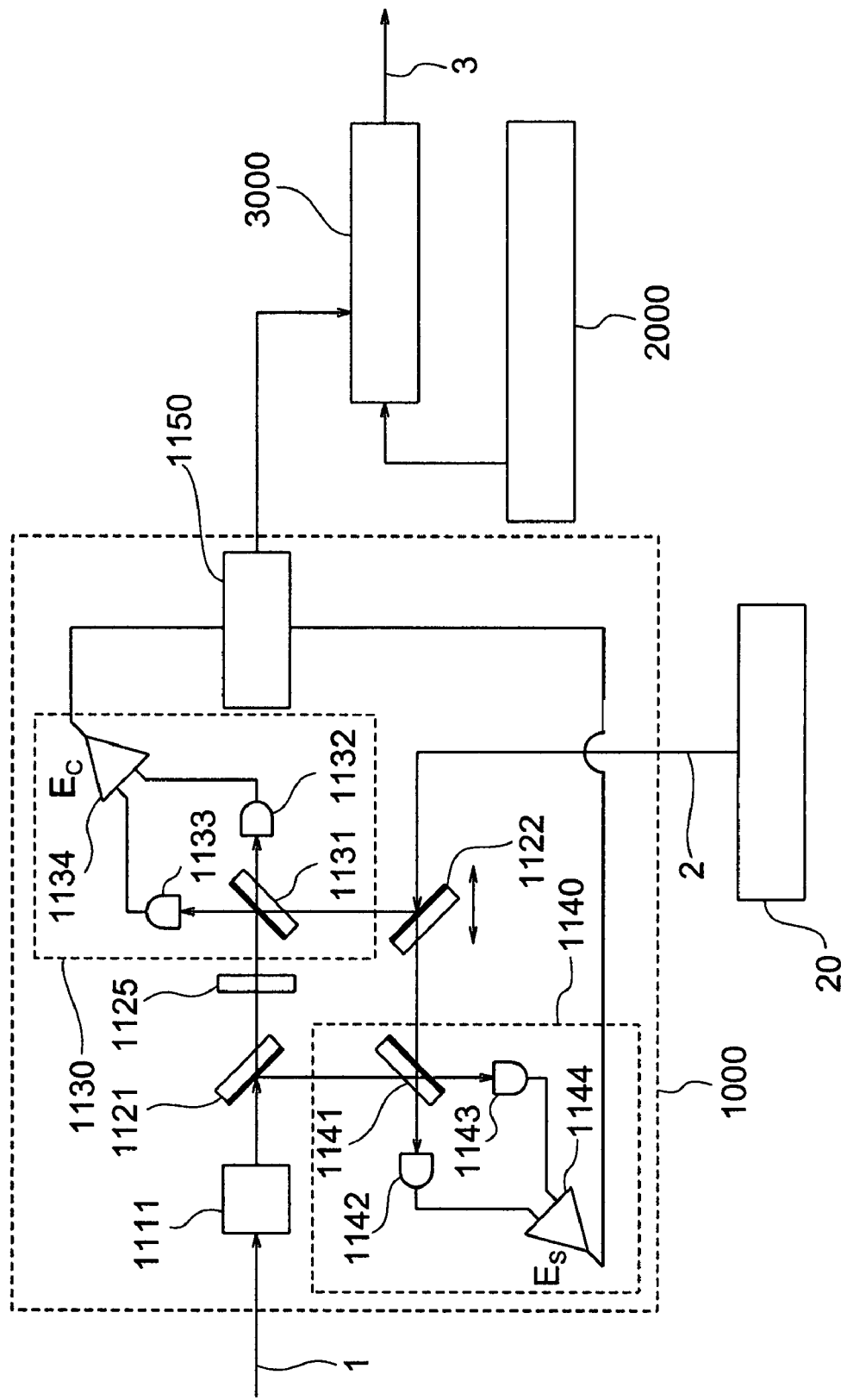
FIG. 5 is a schematic view showing an embodiment of the present invention.

FIG. 5 shows a relative phase measuring apparatus 1000 obtained by realizing faithfully the principles described above. In order to activate the two sets of the homodyne detector 1130 and 1140, each of the signal light 1 and the local light 2 is divided into two beams by beam splitters 1121 and 1122. Since the signal light 1 and the local light 2 are required to have the identical polarizations, a polarization of the signal light 1 is adjusted by a polarization controller 1111 to be identical to a polarization of the local light 2. Normally, linearly polarized lights are used. Inside the homodyne detector 1130, each of the signal light 1 and the local light 2 is divided by two parts by the 50:50 beam splitter 1131 so that one of the parts of the signal light 1 and one of the parts of the local light overlap with each other to interfere with each other to form an interference beam and the other one of the parts of the signal light 1 and the other one of the parts of the local light overlap with each other to interfere with each other to form another interference beam. Those two interference beams are converted respectively into electric signals by photodetectors 1132 and 1133 and the signals are introduced into a differential output device 1134. An output of the differential output device 1134 depends on a relative phase between the signal light 1 and the local light 2. The homodyne detector 1140 has the same operation as the homodyne detector 1130. The outputs of the homodyne detectors 1130 and 1140 need to form respective quadrature components different from each other by 90° as given by $E_sE_L \cos\theta$ and $E_sE_L \sin\theta$, respectively, however, when the homodyne detectors 1130 and 1140 are arranged symmetrically, the identical quadrature components are output. Therefore, a phase difference therebetween needs to be adjusted finely. The phase difference of 90° corresponds to an optical path length of $\lambda/4$, and when an wavelength is 1.55 µm, the optical path length is approximately 0.4 µm. A phase adjustment by that level can be preferably obtained, for example, by structure for moving the beam splitter 1122 in parallel. Such phase adjustment with the parallel movement may be carried out on the beam splitters 1121, 1131 and 1141 other than the beam splitter 1122. Otherwise, a phase adjustor 1125 may be incorporated as a more active manner. The phase adjustor 1125 can be realized, for example, by two wedge-shaped quartz plates or the like. In FIG. 5, the phase adjustor 1125 is installed between the beam splitters 1121 and 1131 but can be installed between the beam splitters 1121 and 1141, between the beam splitters 1122 and 1131 or between the beam splitters 1122 and 1141. When the outputs from the homodyne detectors 1130 and 1140 are adjusted to have respective quadrature components $E_sE_L \cos\theta$ and $E_sE_L \sin\theta$ different from each other by 90°, the angle $\theta$ can be calculated from those values. An arithmetic circuit 1150 is included for that calculation. The arithmetic circuit 1150 calculates $\theta$ according to $\theta = \arctan(E_sE_L \sin\theta / E_sE_L \cos\theta)$.

Embodiment 3

The relative phase measuring apparatus 1000 in the Embodiment 2 duplicates the principle of measurement faithfully and is structured so as to be easily understandable, however, the two homodyne detectors have to be adjusted comparatively with difficulty to allow the quadrature components different from each other by 90° to be measured, and in addition, even when the adjustment is carried out successfully, four light paths from the beam splitters 1121 and 1122 for halving to the beam splitters 1131 and 1141 for interference are separated from each other, so that due to environmental fluctuations, it is also difficult to stabilize at 90° the phase difference between the quadrature components measured respectively by the homodyne detectors 1130 and 1140.

Figure 6:
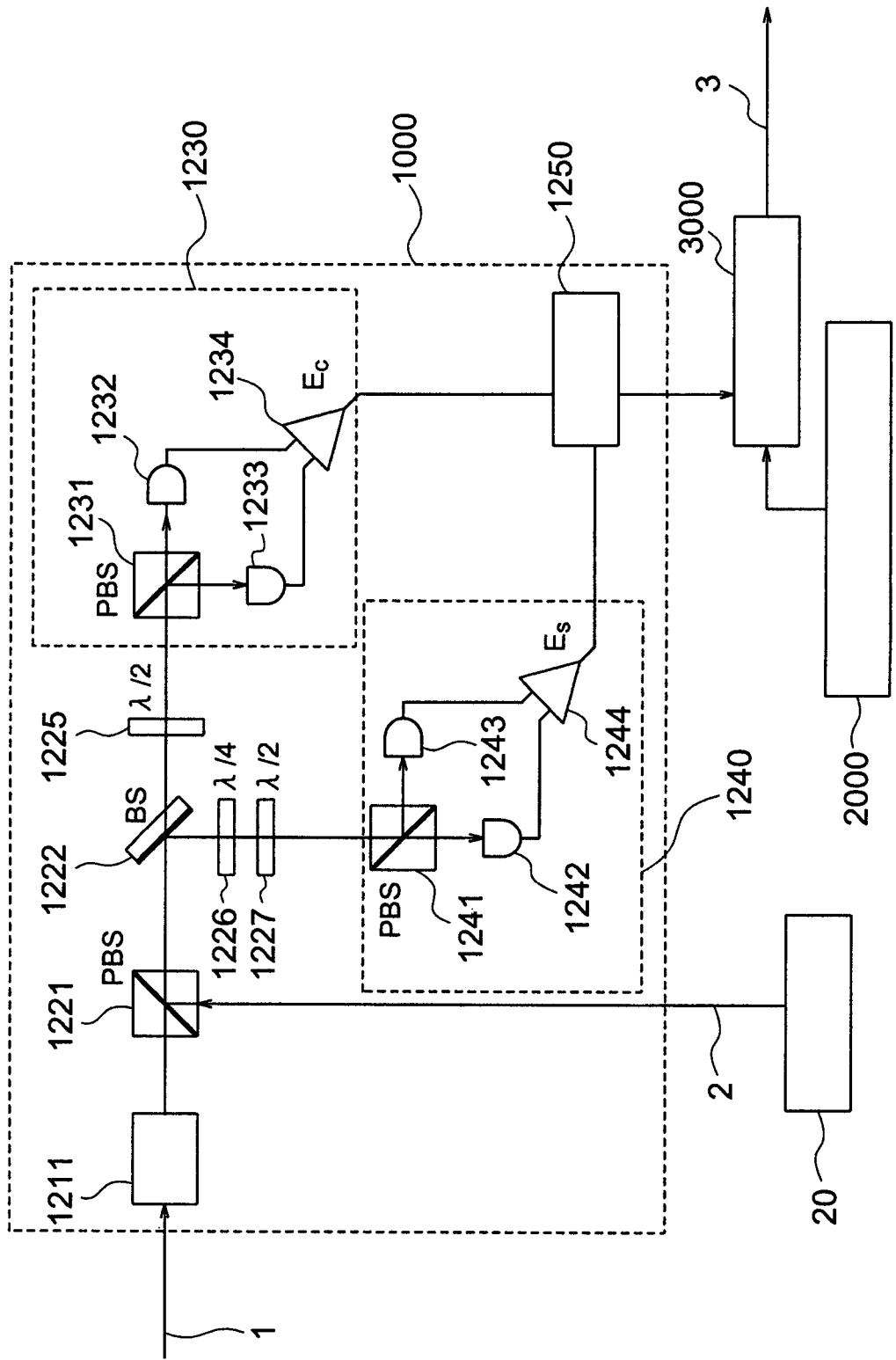
FIG. 6 is a schematic view showing another embodiment of the present invention.

FIG. 6 shows a structure for solving these problems. The input light 1 is adjusted into a linearly polarized light by the polarization controller 1211, and the local light 2 as the linearly polarized light perpendicular to the input light 1 is input to the polarizing beam splitter 1221. Two light beams with polarizations perpendicular to each other are multiplexed and travel in a common light path, and each of the polarized beams is divided by the beam splitter 1122 to two parts. The light beam including one of the two parts passing through the beam splitter 1222 is rotated by 45° by a half waveplate 1225, and subsequently divided into two portions by a polarizing beam splitter 1231. Since the polarizing beam splitter allows a predetermined polarization to pass through the polarizing beam splitter and allows another predetermined polarization to reflect thereon, one of the two portions of the signal light 1 and one of the two portion of the local light 2 reflected by the polarizing beam splitter 1231 have the identical polarizations and the other one of the two portions of the signal light 1 and the other one of the two portion of the local light 2 passing through the polarizing beam splitter 1231 have the identical polarizations. Therefore, the portions of the signal light 1 and the local light 2 reflected by the polarizing beam splitter 1231 interfere with each other to form an interference light beam and the other portions of the signal light 1 and the local light 2 passing through the polarizing beam splitter 1231 interfere with each other to form another interference light beam, and so that the interference light beam and the another interference light beam are converted by the photodetectors 1233 and 1232 into respective electric signals to be introduced to the differential output device 1234. The homodyne detector 1230 performs the same operation as the homodyne detector 1130 in the Embodiment 2. In another homodyne detector 1240, the phase difference $\theta$ between the signal light 1 and the local light 2 is required to be displaced by 90° from the phase difference in the homodyne detector 1230. The $\lambda/4$ waveplate 1226 satisfies that requirement. When the optical axes of the $\lambda/4$ waveplate 1226 are aligned with the polarization directions of the signal light 1 and the local light 2, respectively, a relative phase therebetween is displaced by 90°. Thereafter, as similar to the homodyne detector 1230, a light beam is rotated by 90° by the half waveplate 1227 and is divided by the polarizing beam splitter 1241 into two portions of each of the signal light 1 and the local light 2, and a combination of one of the two portions of the signal light 1 and one of the two portions of the local light 2 reflected by the polarizing beam splitter 1241 and another combination of the other one of the two portions of the signal light 1 and the other one of the two portions of the local light 2 passing through the polarizing beam splitter 1241 are converted into respective electric signals by the photodetectors 1243 and 1242 to be introduced to the differential output device 1244. The $\lambda/4$ waveplate 1226 causes the quadrature components different from each other by 90° to be output from the homodyne detector 1230 and 1240 respectively to obtain the phase difference $\theta$ between the signal light 1 and the local light 2 in a circuit 1250.

In the present embodiment, since after the signal light 1 and the local light 2 are multiplexed with each other by the polarizing beam splitter 1221, the multiplexed lights proceed along the common light path until being converted to the electric signal, even when environmental fluctuations take place, the signal light 1 and the local light 2 are subjected to the same fluctuations, so that fluctuations on the signal light 1 and the local light 2 cancel each other to stably maintain the phase difference between the output quadrature components of the two homodyne detectors. In addition, the $\lambda/4$ waveplate 1226 causes the phase difference to be kept correctly at 90°, and the alignment is easy.

For homodyne detection, it is preferable for a frequency of the signal light and a frequency of the local light to be completely equal to each other, but is actually difficult, whereby a variation of frequency within an acceptable range is actually used. For example, since in DPSK, phase between the adjacent signals needs to be measured, when a difference in frequency between the signal light and the local light is $\Delta f$, and the bit rate is $f_r$ in the transponder device, a condition of $\Delta f \ll f_r$ is required to use the transponder device for the homodyne detection.

Embodiment 4

Figure 7:
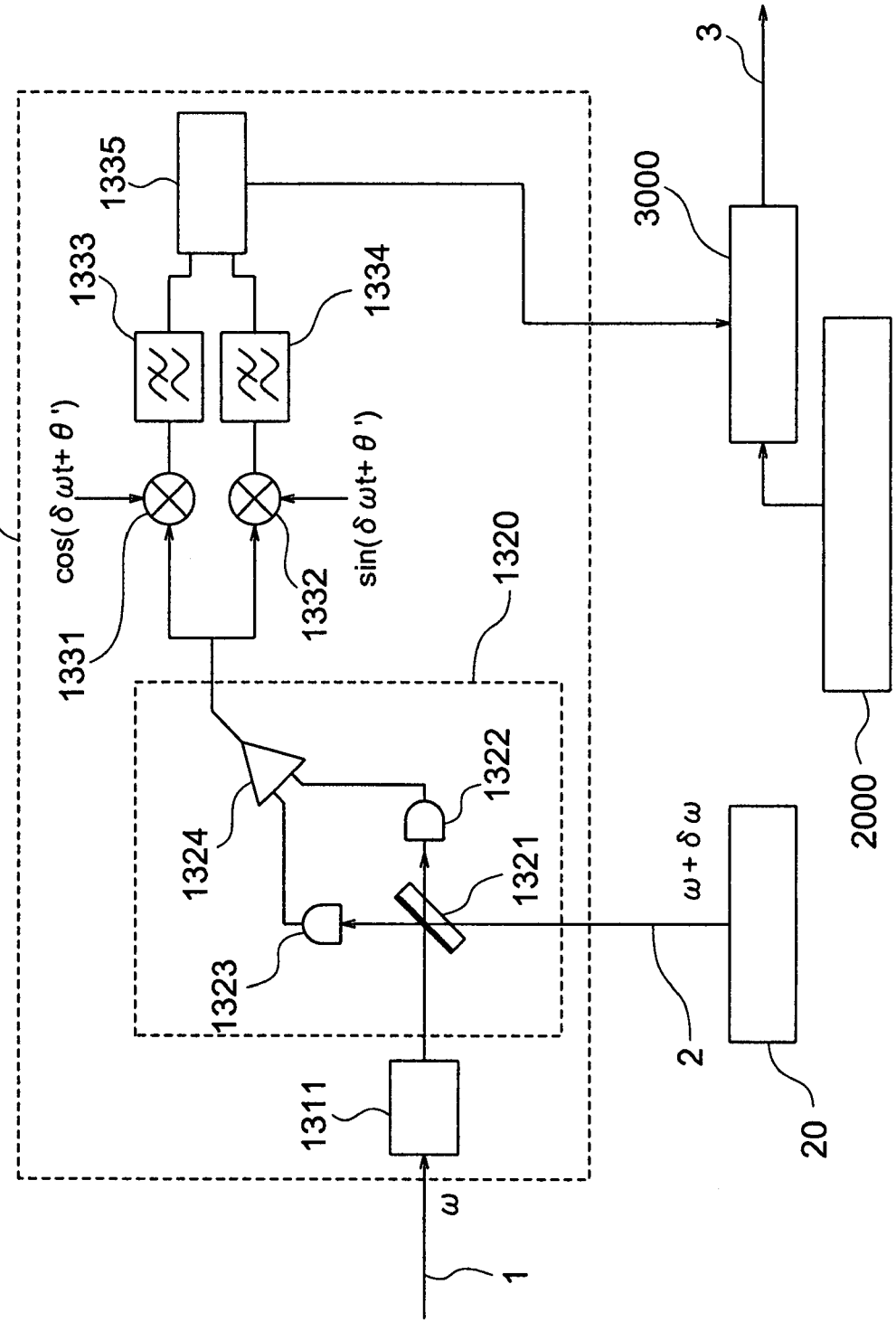
FIG. 7 is a schematic view showing another embodiment of the present invention.

In the embodiments 2 and 3, the homodyne detection is described. An embodiment for heterodyne detection will be described below. Heterodyne detection is a technique that decreases optical processing and increases electrical processing in comparison with the homodyne detection. An embodiment is shown in FIG. 7. An angular frequency of the local light source 20 has $\omega + \delta\omega$ with a displacement of $\delta\omega$ from an angular frequency of the input signal light 1. The input light 1 is controlled by the polarization controller 1311 to have the same polarization as the local light 2. The input signal light 1 and the local light 2 are splitted by a 50:50 beam splitter 1321 to interfere with each other to form two interfered light beams, and the interfered light beams are converted by the photodetector 1322 and 1323 into respective electric signals to be introduced to a differential output device 1324. As similar to the homodyne detection, the output from the differential output device 1324 is $E_s E_L \cos(\delta\omega t+\theta)$. Here, $\theta=\phi_1-\phi_L$. Next, mixers 1331 and 1332 mix sine wave of $\cos(\delta\omega t+\theta')$ and $\sin(\delta\omega t+\theta')$ with the output from the differential output device to obtain $(E_s E_L/2)[\cos(2\delta\omega t+\theta+\theta')+\cos(\theta-\theta')]$ and $(E_s E_L/2)[\sin(2\delta\omega t+\theta+\theta')-\sin(\theta-\theta')]$. After the mixtures pass low band pass filters 1333 and 1334 respectively to cut high frequency components $2\delta\omega$ therefrom, the signal reaching the circuit 1335 is $(E_s E_L/2)\cos(\theta-\theta')$ and $-(E_s E_L/2)\sin(\theta-\theta')$. The circuit 1335 calculates $\theta-\theta'=\arctan((E_s E_L/2)\sin(\theta-\theta')/(E_s E_L/2)\cos(\theta-\theta'))$ so that the relative phase of $\phi_1$ with reference to $\phi_L+\theta'$ is obtained. A phase modulator 3000 modulates an output light from an antisqueezed light source 2000 in accordance with $\theta-\theta'$ obtained by the circuit 1335.

In the heterodyne method, it is preferable for the difference in angular frequency $\delta\omega$ between the signal light 1 and the local light 2 to be accurately equal to the frequency component to be mixed in the mixers 1331 and 1332, but a certain acceptable range is usable, similar to the homodyne detection. When the difference in angular frequencies therebetween is $2\pi\Delta f$, a condition of $\Delta f \ll f_r$ is required in the transponder device of the heterodyne method.

Embodiment 5

Figure 8:
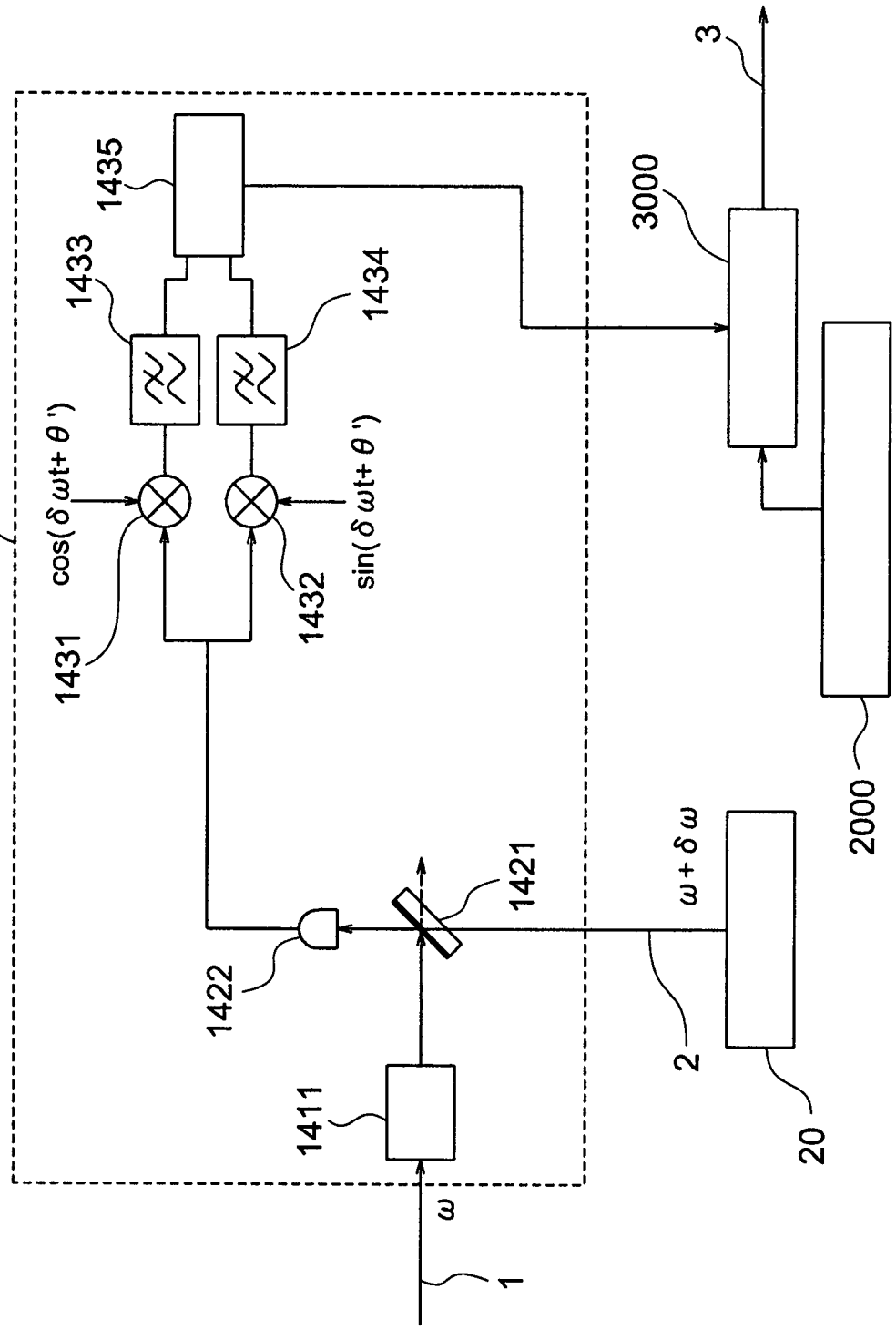
FIG. 8 is a schematic view showing another embodiment of the present invention.

In an embodiment 4, a balanced detector 1320 receives a signal light. The balanced detector has an advantage of that DC components cancel each other so that only signal components are taken out. However, in the heterodyne detection, the signal is detected as an alternate current component of $\delta\omega$ and the other alternate current components are cut by a filter, so that DC components do not cause any problems even if they remain after the light is received. An embodiment with taking this into consideration is shown in FIG. 8. The signal light 1 and the local light 2 interfere with each other at the beam splitter 1421 to be received by a photodetector 1422. A signal output from the photodetector 1422 includes the $\delta\omega$ component and the DC component, however, since the original DC component is cut by the mixers 1431 and 1432 and the low band pass filters 1433 and 1434, a signal obtained by a circuit 1435 is $\theta-\theta'$, similar to the Embodiment 4.

A splitting ratio of the beam splitter 1421 does not have to be 50:50 but may have various values. From a point of view of utilizing effectively the signal light, it is preferable for a reflecting power to be sufficiently great. In ordinary, in measurement of a state on quantum mechanics, it is normal to make the reflecting power large so that the state on quantum mechanics can be measured as correctly as possible. In that case, a large part of the local light is wasted.

Embodiment 6

Figure 9:
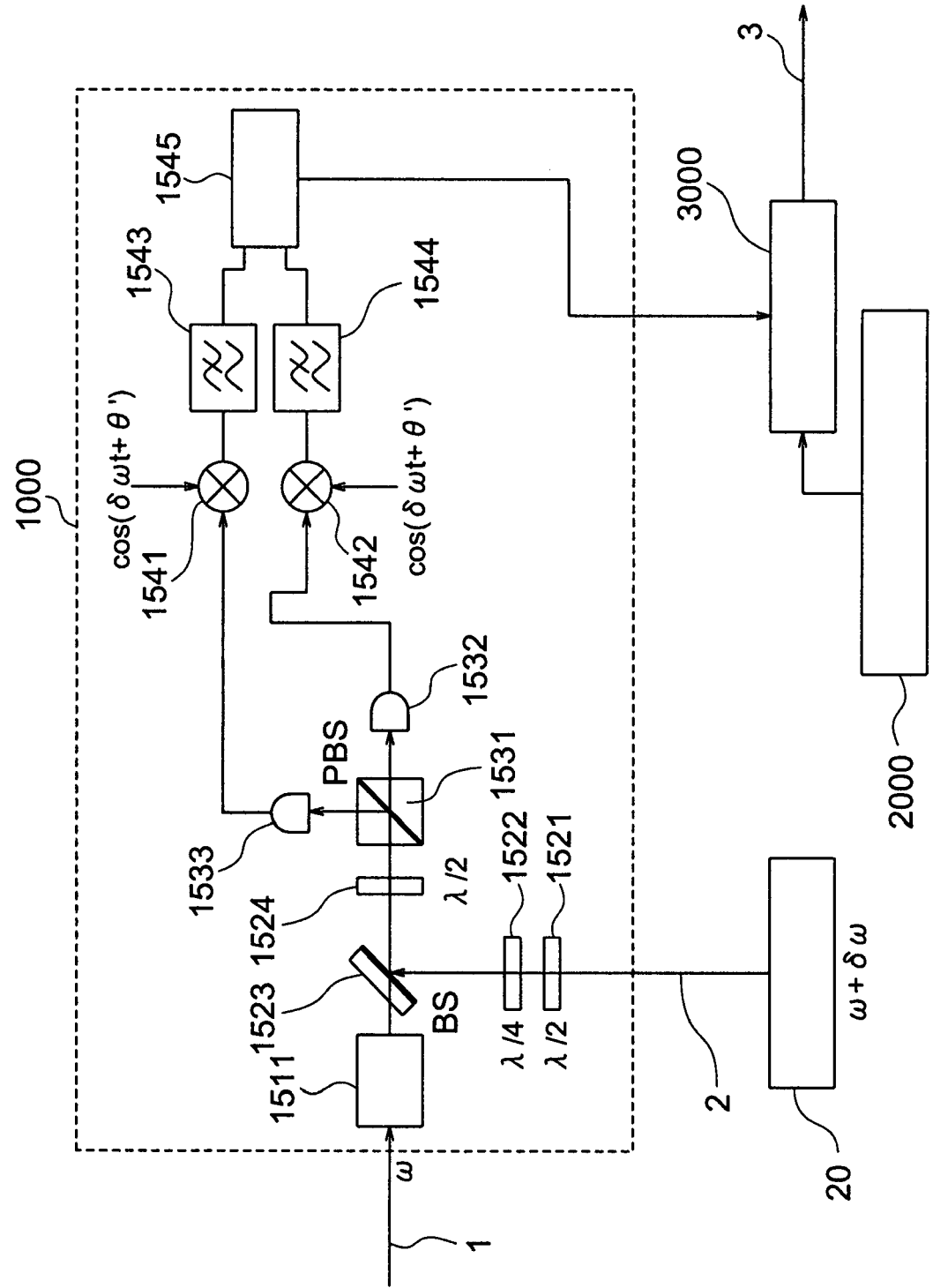
FIG. 9 is a schematic view showing another embodiment of the present invention.

In the Embodiment 5, the signal generated by the photodetector receiving the light is divided into two components from which a cosine component and a sine component are respectively drawn. Two of the photodetectors may be used to enable the light to be divided into the two components before the light is received by the two of the photodetectors. FIG. 9 shows an embodiment of such a case. The input signal light is adjusted by the polarization controller 1511 into a linearly polarized light, and the local light 2 is converted by a half waveplate 1521 and $\lambda/4$ waveplate 1522 into a circularly polarized light so that the linearly polarized light and the circularly polarized light are made by a polarizing beam splitter 1523 interfere with each other. The half waveplate 1524 adjusts the polarization of the input signal light so that the input light 1 is divided by 50:50 by the polarizing beam splitter 1531. If a polarization controller 1511 is adjusted appropriately, the half waveplate 1524 may be eliminated. Since the circularly polarized light is formed by a combination of the two linearly polarized lights perpendicular to each other with a difference in phase of 90° therebetween, two parts of the circularly polarized local light 2 divided by the polarizing beam splitter 1531 form a difference in phase of 90° therebetween. Consequently, the relative phase between the signal light 1 and local light 2 is 90° different between at the photodetector 1532 and at the photodetector 1533. Accordingly, when mixing each of the output signals of the photodetectors 1532 and 1533 with a common $\cos(\delta\omega+\theta')$ component in corresponding one of mixers 1541 and 1542, each of $\cos(\theta-\theta')$ and $\sin(\theta-\theta')$ components of the mixtures is obtained by making the mixtures pass through corresponding one of low band pass filters 1543 and 1544, respectively. A circuit 1545 calculates $\theta-\theta'$ according to $\theta-\theta'=\arctan(\sin(\theta-\theta')/\cos(\theta-\theta'))$.

Incidentally, a splitting ratio of the beam splitter 1523 does not have to be 50:50 and may have various values. From a point of view of utilizing the signal light effectively, it is preferable for a transmission coefficient to be sufficiently high. In general, for measurement in a state based on quantum mechanics, it is ordinary to set the transmission coefficient high so that the state based on quantum mechanics can be measured as correctly as possible. In such a case, the local light is not utilized effectively.

Embodiment 7

Figure 10:
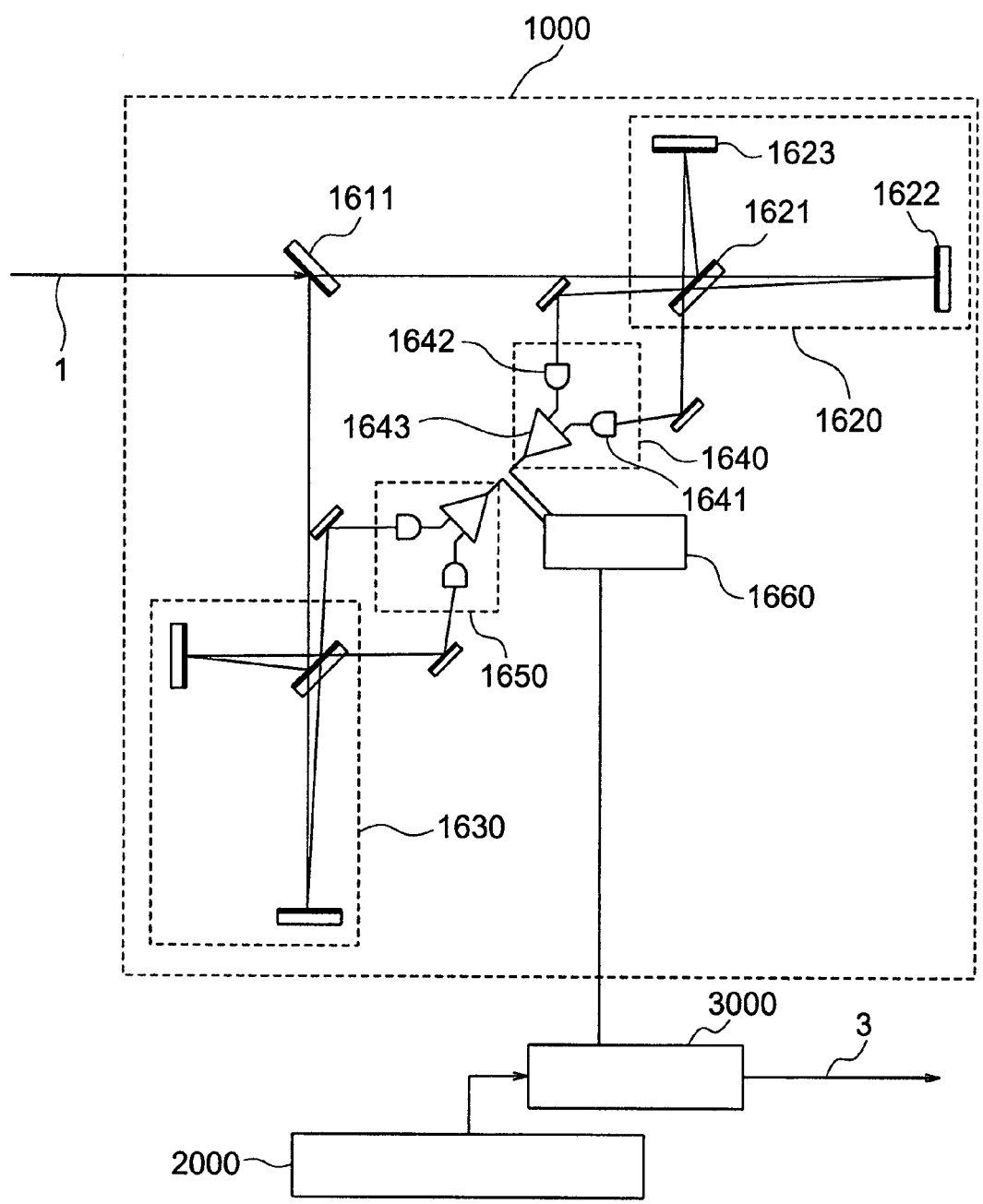
FIG. 10 is a schematic view showing another embodiment of the present invention.

In the embodiments described above, the local light source 20 is used. However, when the local light source is used, a frequency of the local light source is required to accurately equal to a frequency of the signal light in the homodyne detection, and a difference in frequency between the local light source and the signal light has to be kept within a predetermined value in the heterodyne detection. Since a circuit for realizing each of them needs to be slightly complicated, it is preferable for the signal light to be used as the local light. FIG. 10 shows an embodiment for such a case. The input light 1 is divided by a beam splitter 1611 into two parts. One of the parts of the input light is divided by a 50:50 beam splitter 1621 into two portions of the one of the parts of the input light, the two portions are reflected by mirrors 1622 and 1623 respectively to form a difference in optical path length of one bit therebetween, and subsequently, the two portions interfere with each other at the beam splitter 1621 in an asymmetric interferometer 1620 while each of the two portions is divided by the beam splitter 1621 into two segments, one of the two segments of one of the two portions and one of the two segments of the other one of the two portions interfere with each other and form a substitute for one of the two portions, and the other one of the two segments of the one of the two portions and the other one of the two segments of the other one of the two portions interfere with each other and form another substitute for the other one of the two portions. The substitutes for the two portions are detected by photodetectors 1641 and 1642 respectively to generate respective signals to be introduced into a differential output device 1643 so that the differential output device 1643 outputs a differential signal. The other one of the two parts is treated similarly by an asymmetric interferometer 1630 and a balanced detector 1650.

The phase difference between bits adjacent to each other is detected in the present configuration. As similar to the embodiment 6 inclusive, in order to obtain the phase difference θ between the adjacent bits, it is necessary to measure the quantities on cos θ and sin θ respectively. For that purpose, a difference between a difference in phase between the two light paths of the asymmetric interferometer 1620 and a difference in phase between the two light paths of the asymmetric interferometer 1630 needs to be 90°. While the phase difference θ is obtained by the circuit 1660 as similar to the embodiment 6, the output light generated by the antisqueezed light source 2000 needs to be modulated by a phase modulator 3000 in accordance with a phase with respect to each of the bits other than the phase difference θ between the adjacent bits. Therefore, the circuit 1660 is provided with a circuit for calculating $(\Sigma_{(i \geq j)} \theta_j - 2\pi n)$ (here, n is an integer number satisfying $0 \leq \Sigma_{(i \geq j)} \theta_j - 2\pi n < 2\pi$) when $\theta_i$ is the phase difference between the $(i-1)_{th}$ and $i_{th}$ signals.

Since in the embodiments using the local light, an influence of the fluctuations of the local light can be restrained to the minimum degree, the fluctuations of the phase measured in the transponder device is close to a fluctuations of the signal light. However, in this embodiment using the signal light as a substitute for the local light, the measured phase doubly includes the fluctuations of the signal light.

Which is used, the embodiments 1-6 using the local light or this embodiment using the signal light as the substitute for the local light, is determined in accordance with a system designing. When the measured fluctuations are desired to be restrained to the lowest degree, the configuration using the local light source is used. When a simple electric system is desired, this embodiment using the signal light as the substitute for the local light is used.

Incidentally, the asymmetric interferometer in the drawing is an asymmetric Michelson-type interferometer, however, another type of asymmetric interferometer may be used. For example, an asymmetric Mach-Zehnder-type interferometer may be used as a substitute for the asymmetric Michelson-type interferometer.

The substance of this embodiment will be described below.

An optical transponder for generating an output light from a signal light including signals superimposed on as the phase difference between successive bits whose interval is δL in optical length, comprises, a first beam splitter for dividing the signal light into first and second beam splitter output lights, a first asymmetrical interferometer of one of Mickelson type and Mach-Zehnder type, for receiving the first beam splitter output light with the difference δL in optical length to generate first and second interferometer output lights, first and second photodetectors for converting the first and second interferometer output lights to first and second electric signals, a first differential output device for receiving the first and second electric signals, a second asymmetrical interferometer of one of Mickelson type and Mach-Zehnder type, for receiving the second beam splitter output light with the difference δL in optical length to generate third and fourth interferometer output lights, third and fourth photodetectors for converting the third and fourth interferometer output lights to third and fourth electric signals, a second differential output device for receiving the third and fourth electric signals, an antisqueezed light source for generating a pulsed light, and a phase modulator for modulating the pulsed light, wherein a phase difference between the difference δL in optical length of the first asymmetrical interferometer and the difference δL in optical length of the second asymmetrical interferometer is set at 90 degrees to make the first and second differential output devices output respective components of output signals different from each other in phase by 90 degrees, so that a relative phase θ between signals adjacent to each other is obtained from the outputs of the first and second differential output devices, and the pulsed light of $i_{th}$ generated by the antisqueezed light source is modulated by a value determined according to the formula of $\Sigma_{(i \geq j)} \theta_j - 2\pi n$, when $\theta_i$ is the phase difference between signal of $(i-1)_{th}$ and signal of $i_{th}$, and n is an integral number satisfying the formula of $0 \leq \Sigma_{(i \geq j)} \theta_j - 2\pi n < 2\pi$.

Embodiment 8

The embodiments described above are used for measuring the relative phase. Lastly, an embodiment of an antisqueezed light source 2000 will be described.

Figure 11:
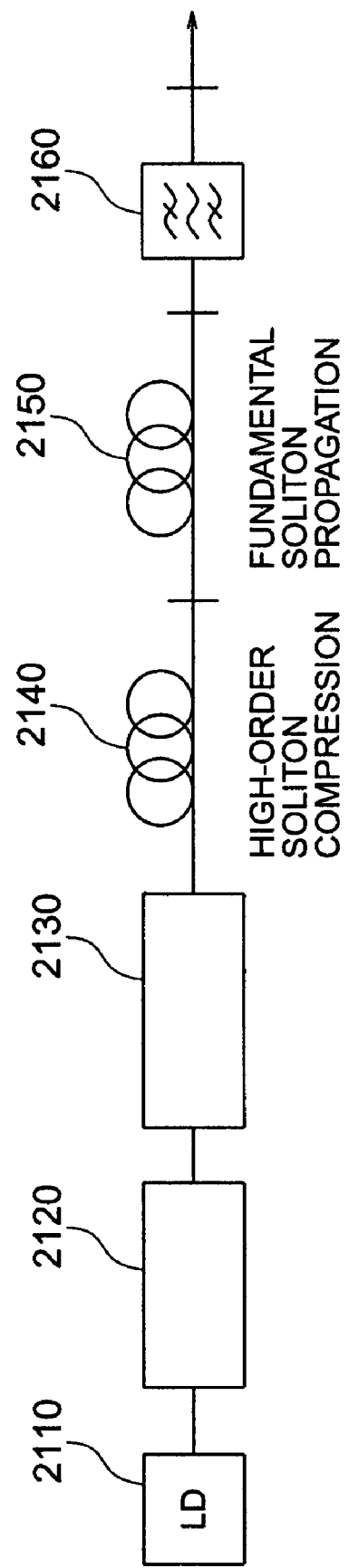
FIG. 11 is a block diagram showing an embodiment of an antisqueezed light source.

FIG. 11 is a block diagram showing an embodiment of the antisqueezed light source. An output light generated by a continuously oscillating laser diode (LD) 2110 is converted into pulsed light by an intensity modulator 2120, amplified by an optical amplifier 2130, and is transmitted through a single mode fiber 2140 having a negative group-velocity dispersion for the operating wavelength of the LD 2110. The pulsed light passing through the optical fiber receives a chromatic dispersion effect based on a characteristic of the optical fiber and Kerr effect changeable in accordance with an intensity of the light, and the chromatic dispersion effect and the Kerr effect balance with each other under a certain optical intensity to keep the pulse shape of the pulsed light to be transmitted through the fiber. This is a so-called fundamental soliton. When the optical intensity is higher than the fundamental-soliton state, a high-order soliton is obtained so that a pulse width varies with the so-called soliton period. By interrupting the optical transmission through the fiber 2140 in response to that the pulse width becomes minimum, the pulsed light having a width shorter than at the original width of the pulsed light can be obtained. If transmitting the pulsed light through a single mode optical fiber 2150 while keeping its peak intensity that has increased in accordance with decrease of the pulse width, the Kerr effect is strengthened by the increased peak intensity of the pulsed light, and antisqueezed light including fluctuations enlarged in the phase direction is obtained. Further, since the original fluctuations are amplified by the optical amplifier 2130, antisqueezing is further increased. The fundamental-soliton state needs to be satisfied to enable the pulse shape to be kept through the fiber 2150, and therefore the fiber 2150 needs to have the magnitude of the negative group-velocity dispersion smaller than the magnitude of the negative group-velocity dispersion of the fiber 2140 satisfying the high order soliton condition. Since the pulsed light is transmitted through the fiber 2150 while keeping the increased peak intensity, a peak wavelength is changed by Raman effect, whereby a band pass filter 2160 removes a part of the light having the original wavelength generated by the LD 2110 from the light output from the fiber 2150.

The embodiments of the present invention provide respective relay methods necessary for realizing secure communications using quantum-mechanical characteristics for macroscopic optical intensity. That is, the present invention provides a key apparatus for actually realizing the secure communication method, and its applicability is high.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical transponder for generating an output light from a signal light including signals superimposed on as the phase difference between successive bits whose interval is δL in optical length, comprising,
   a first beam splitter for dividing the signal light into first and second beam splitter output lights,
   a first asymmetrical interferometer of one of Mickelson type and Mach-Zehnder type, for receiving the first beam splitter output light with the difference δL, in optical length to generate first and second interferometer output lights,
   first and second photodetectors for converting the first and second interferometer output lights to first and second electric signals,
   a first differential output device for receiving the first and second electric signals,
   a second asymmetrical interferometer of one of Mickelson type and Mach-Zehnder type, for receiving the second beam splitter output light with the difference δL in optical length to generate third and fourth interferometer output lights,
   third and fourth photodetectors for converting the third and fourth interferometer output lights to third and fourth electric signals,
   a second differential output device for receiving the third and fourth electric signals,
   an antisqueezed light source for generating a pulsed light, and
   a phase modulator for modulating the pulsed light,
   wherein a phase difference between the difference δL in optical length of the first asymmetrical interferometer and the difference δL in optical length of the second asymmetrical interferometer is set at 90 degrees to make the first and second differential output devices output respective components of output signals different from each other in phase by 90 degrees, so that a relative phase θ between signals adjacent to each other is obtained from the outputs of the first and second differential output devices, and
   the pulsed light of $i_{th}$ generated by the antisqueezed light source is modulated by a value determined according to the formula of $\Sigma_{(i \equiv j)} \theta_j - 2\pi n$, when $\theta_i$ is the phase difference between signal of $(i-1)_{th}$ and signal of $i_{th}$, and n is an integral number satisfying the formula of $0 \leq \Sigma_{(i \equiv j)} \theta_j - 2\pi n \leq 2\pi$.

* * * * *